(12) United States Patent
Nakai et al.

(10) Patent No.: US 9,696,415 B2
(45) Date of Patent: Jul. 4, 2017

(54) RADAR APPARATUS

(71) Applicant: TOYOTA JIDOSHA KABUSHIKI KAISHA, Toyota-shi, Aichi-ken (JP)

(72) Inventors: Makoto Nakai, Nagakute (JP); Shin-ichiro Matsuzawa, Nagakute (JP); Yoshiaki Minami, Gotenba (JP); Yuji Oda, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 395 days.

(21) Appl. No.: 14/503,855

(22) Filed: Oct. 1, 2014

(65) Prior Publication Data

US 2015/0097713 A1 Apr. 9, 2015

(30) Foreign Application Priority Data

Oct. 3, 2013 (JP) ................ 2013-208624

(51) Int. Cl.
*G01S 13/04* (2006.01)
*G01S 7/41* (2006.01)
(Continued)

(52) U.S. Cl.
CPC ........... *G01S 13/04* (2013.01); *G01S 7/41* (2013.01); *G01S 13/06* (2013.01); *G01S 13/28* (2013.01); *G01S 13/34* (2013.01)

(58) Field of Classification Search
CPC . G01S 13/04; G01S 7/41; G01S 13/06; G01S 13/34; G01S 13/28
(Continued)

(56) References Cited

U.S. PATENT DOCUMENTS 4,549,181 A * 10/1985 Tachibana ............ G01S 13/62
340/901
6,184,819 B1 * 2/2001 Adomat ................ G01S 13/48
342/107
(Continued)

FOREIGN PATENT DOCUMENTS

JP 6-3443 A 1/1994
JP 8-220219 A 8/1996
(Continued)

OTHER PUBLICATIONS

Communication dated Sep. 1, 2015 from the Japanese Patent Office in counterpart Application No. 2013-208624.

*Primary Examiner* — John B Sotomayor
(74) *Attorney, Agent, or Firm* — Sughrue Mion, PLLC

(57) ABSTRACT

A radar apparatus includes a change amount calculation section for obtaining, for each of a plurality of peaks of a first spectrum belonging to the same group, a peak value at the present point in time and calculating the difference between the peak value and a peak value obtained before the present point in time; a ratio calculation section for comparing the obtained difference with a predetermined difference threshold and calculating a ratio of the number of peaks whose differences are greater than the difference threshold to the number of all the peaks belonging to the same group; and a pedestrian determination section for determining that the object is a pedestrian when the calculated ratio is greater than a predetermined ratio threshold and at least one of peaks belonging to the same group differs from the remaining peaks in terms of the sign of the difference.

11 Claims, 10 Drawing Sheets

(51) Int. Cl.
*G01S 13/06* (2006.01)
*G01S 13/28* (2006.01)
*G01S 13/34* (2006.01)

(58) Field of Classification Search
USPC ............... 342/27, 28, 70–72, 107–116, 192
See application file for complete search history.

(56) References Cited

U.S. PATENT DOCUMENTS

| | | | | |
|---|---|---|---|---|
| 6,703,967 | B1 * | 3/2004 | Kuroda | G01S 13/348 342/111 |
| 8,878,719 | B2 * | 11/2014 | Nakabayashi | G01S 7/03 342/165 |
| 2004/0140927 | A1 * | 7/2004 | Meinecke | G01S 13/583 342/70 |
| 2005/0116855 | A1 * | 6/2005 | Toennesen | G01S 13/582 342/70 |
| 2011/0001656 | A1 * | 1/2011 | Nakai | G01S 3/74 342/99 |
| 2015/0042503 | A1 * | 2/2015 | Morelande | G01S 13/347 342/27 |
| 2015/0097713 | A1 * | 4/2015 | Nakai | G01S 13/04 342/27 |

FOREIGN PATENT DOCUMENTS

| | | | |
|---|---|---|---|
| JP | 2003-177179 | A | 6/2003 |
| JP | 2004-325113 | A | 11/2004 |
| JP | 2004-361154 | A | 12/2004 |
| JP | 2005-308545 | A | 11/2005 |
| JP | 2009-295184 | A | 12/2009 |
| JP | 2010-151621 | A | 7/2010 |
| JP | 2012-112653 | A | 6/2012 |
| JP | 2012-145444 | A | 8/2012 |
| JP | 2014224794 | A * | 12/2014 |
| JP | 2015072224 | A * | 4/2015 |

* cited by examiner

DATA AT TIME t-1

DATA AT TIME t

RADAR APPARATUS

BACKGROUND OF THE INVENTION

Field of the Invention

The present invention relates to a radar apparatus which can measure a distance to an object and which can determine whether or not the object is a pedestrian. Notably, the term "pedestrian" used herein encompasses not only a pedestrian but also a person in an automobile or the like.

Background Art

A radar apparatus is known as an apparatus for detecting an object. The radar apparatus radiates a radio wave toward an object, receives a reflection wave from the object, and detects the distance to the object and the velocity and bearing of the object. Examples of known methods for measurement of distance and velocity include a FM-CW method, a multi-frequency CW method, and a pulse method. Examples of known methods for measurement of bearing include a digital beam forming method and a phase monopulse method. In recent years, radar apparatuses are mounted on automobiles, etc., and are used for controlling the distance between vehicles and avoiding collision.

Patent Document 1 discloses a method of determining whether or not an object detected by a radar apparatus is a pedestrian. According to the method disclosed in Patent Document 1, the distance to an object and the bearing of the object are detected by a radar apparatus, image data are obtained by a camera, and the determination as to whether or not the object is a pedestrian is made by analyzing image data of a region determined by the distance and bearing of the object detected by the radar apparatus.

Patent Document 3 discloses a method of determining the type of an object as follows. Of a plurality of peaks of a frequency spectrum obtained by a radar apparatus, a certain peak is compared with a corresponding peak measured the last time so as to calculate the amount of change with time (hereinafter referred to as the "time cause change"). The amount of change is compared with a probability distribution table, and the type of an object which is most likely to have such a change amount is determined to be the type of the actual object. Similar determination is made for other peaks. For example, a vehicle is small in the time cause change of a peak, and a pedestrian is large in the time cause change of a peak. Therefore, determination as to whether an object is a vehicle or a pedestrian can be made by the above-described method.

In the case where a radar apparatus is used to measure the distance between the apparatus and an object, since the object is generally a three-dimensional object having a certain size, a plurality of reflection points may be present on the object, and consequently, a plurality of peaks may be detected. Namely, even though only one object is present, the radar apparatus may erroneously determine that a plurality of objects is present. Therefore, it is necessary to group the detected peaks on an object-by-object basis such that the number of groups coincides with the number of objects, to thereby allow correct detection of the objects.

Patent Document 2 discloses a method of grouping peaks. Patent Document 2 describes that a plurality of peaks which differ in bearing angle and are the same or approximately the same in distance and which form a local maximum are grouped into a single group. Patent Document 2 also describes that the bearing angle of the object is detected through image recognition by a camera or the like, and the grouping is corrected. For example, in the case where peaks associated with two objects adjacent to each other are detected such that they belong to a single group, the group of peaks is divided into two groups by the correction performed through image recognition.

Patent Document 1: Japanese Patent Application Laid-Open (kokai) No. 2009-295184
Patent Document 2: Japanese Patent Application Laid-Open (kokai) No. 2010-151621
Patent Document 3: Japanese Patent Application Laid-Open (kokai) No. 2012-112653

However, the determination method of Patent Document 1 increases cost, because the method requires a camera in addition to a radar apparatus. Therefore, there has been demand for a method of determining whether or not an object is a pedestrian, at lower cost.

The pedestrian determination method of Patent Document 3 has the following problem. For example, in a situation where a vehicle is present behind a pedestrian, a reflection wave from the vehicle is blocked by the pedestrian, and the peak value changes greatly. If the pedestrian determination method of Patent Document 3 is performed on the basis of such a change amount of the peak value, the vehicle is also highly likely to be determined to be a pedestrian. Therefore, in the case where the pedestrian determination method of Patent Document 3 is used for applications such as an automatic drive system and a collision prevention system of a vehicle, the above-mentioned great change of the peak value causes an erroneous operation.

SUMMARY OF THE INVENTION

The present invention has been accomplished for solving the aforementioned problems. An object of the present invention is to provide a radar apparatus which can accurately determine whether or not an object is a pedestrian.

The present invention provides a radar apparatus which transmits a transmission wave toward an object and receives a reception wave which is the transmission wave reflected by the object. The radar apparatus comprises a first spectrum calculator for calculating, by using the reception wave, a first spectrum which is a function of a physical quantity used for distance measurement; a grouping section which groups a plurality of peaks of the first spectrum on an object-by-object basis; a change amount calculator for obtaining, for each of a plurality of peaks belonging to a group, a peak value at the present point in time, comparing the peak value with a peak value obtained before the present point in time, and calculating a change amount of each peak; a ratio calculator for comparing the change amount with a predetermined change amount threshold and calculating a ratio of the number of peaks whose change amounts are greater than the change amount threshold to the number of peaks belonging to the group; and a pedestrian determination section for determining that the object is a pedestrian when the ratio calculated by the ratio calculator is greater than a predetermined ratio threshold and at least one of peaks belonging to the group differs from the remaining peaks in terms of the sign of the difference between the peak value at the present point in time and the peak value before the present point in time.

The physical quantity used for distance measurement may be frequency, phase, time, or distance, and may be chosen in accordance with the distance measurement method employed by the radar apparatus of the present invention. For example, the physical quantity is frequency in a FM-CW method, the physical quantity is phase in a multi-frequency CW method, and the physical quantity is time in a pulse method.

No limitation is imposed on the change amount so long as the change amount represents changes with respect to a time in the peak value. The change amount may be the absolute value of the difference between the corresponding peak values, the standard deviation of the corresponding peak values varying with a time, the standard error of the peak values varying with a time, or the absolute value of the time derivative of the peak values varying with a time. The change amount may be determined in consideration of a plurality of values selected from these values. In particular, it is preferred that the difference and/or the time derivative be taken into consideration. This is because the sign (plus/minus) of the difference required by the pedestrian determination section can be obtained simultaneously, and it is unnecessary to obtain the sign of the difference separately.

The change amount threshold and the ratio threshold may be set to proper values in accordance with the structure of the radar, measurement environment, etc., and be changed, whenever necessary, in accordance with measurement environment, etc.

The case where at least one of peaks belonging to a group differs from the remaining peaks in terms of the sign of the difference of the peak value refers to the case where not all the differences of the peak values are positive (plus) or not all the differences of the peak values are negative (minus).

Conventionally known various methods may be used for grouping, and these methods may be used in combination. For example, there can be used a method of detecting the bearing or velocity of an object by using the radar apparatus and grouping peaks on a bearing-by-bearing basis or a velocity-by-velocity basis. A digital beam forming (DBF) method, a phase mono-pulse method, or the like may be used for bearing measurement.

The radar apparatus of the present invention may further comprise a second spectrum calculator for calculating, by using a portion of a frequency band of the reception wave used by the first spectrum calculator, a second spectrum which is a function of the physical quantity used for distance measurement. In this case, for each peak of the second spectrum, the grouping section groups a plurality of peaks of the first spectrum at positions contained in the peak of the second spectrum while regarding the plurality of peaks as those from the same object.

The portion of a frequency band of the reception wave, which portion is used for calculation of the second spectrum, is not limited to a portion of the reception wave itself, and may be a portion of the beat signal or a portion of a base band signal obtained through conversion. Also, the term "frequency band" means not only the frequency band but also a section (e.g., time) of a parameter which relates directly or indirectly to frequency.

In the case where the radar apparatus of the present invention is a FM-CW radar apparatus, the first spectrum calculator may be device for producing a beat signal whose frequency is equal to the difference between those of the transmission wave and the reception wave and calculating the frequency spectrum of the beat signal as the first spectrum, and the second spectrum calculator may be device for producing a beat signal whose frequency is equal to the difference between those of the transmission wave and the reception wave, extracting a predetermined continuous section of a time waveform of the beat signal, and calculating the frequency spectrum of the extracted beat signal.

In the case where the radar apparatus of the present invention is a multi-frequency CW radar apparatus, the frequency of the transmission signal may be increased in a plurality of steps, the first spectrum calculator may be device for producing a beat signal whose frequency is equal to the difference between those of the transmission wave and the reception wave, calculating the frequency spectrum of the beat signal in each step, and calculating a spectrum of the phase difference between the transmission wave and the reception wave from the frequency spectrums, and the second spectrum calculator may be device for producing a beat signal whose frequency is equal to the difference between those of the transmission wave and the reception wave, calculating the frequency spectrum of the beat signal in each step of a portion of all the steps, and calculating a spectrum of the phase difference between the transmission wave and the reception wave from the frequency spectrums. Conventionally known various methods may be used for calculation of the spectrum of the phase difference.

In the case where the radar apparatus of the present invention is a pulse radar apparatus, the first spectrum calculator may be device for detecting a time waveform of the reception wave, and the second spectrum calculator may be device for passing the reception wave through a filter of a predetermined frequency band and detecting a time waveform of the passed reception wave. Further, a pulse compression method may be used in the present invention.

In the radar apparatus of the present invention, determination as to whether or not an object is a pedestrian is made by detecting a large change of a plurality of reflection points on the object. Therefore, the determination as to whether or not an object is a pedestrian can be made by a low-cost configuration. In particular, the sign of the difference between peaks values is determined for the peaks belonging to the same group. Therefore, it is possible to more accurately distinguish a pedestrian and a vehicle from each other.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

Specific embodiments of the present invention will next be described with reference to the drawings. However, the present invention is not limited to the embodiments.

First Embodiment

Figure 1:
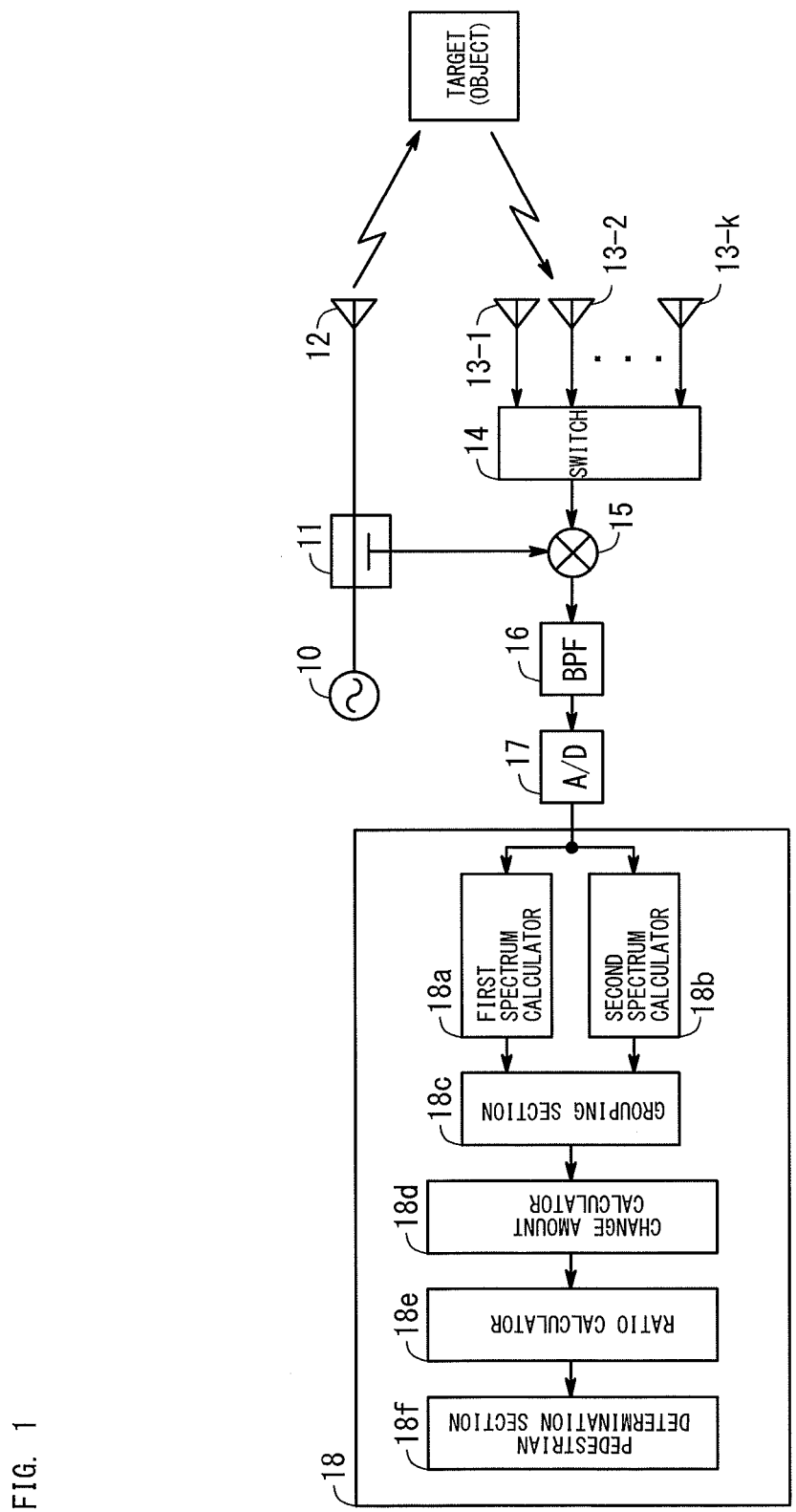
FIG. 1 is a block diagram showing the configuration of a radar apparatus according to a first embodiment.

FIG. 1 is a block diagram showing the configuration of a radar apparatus according to a first embodiment. The radar apparatus of the first embodiment uses an FM-CW method for measurement of distance and velocity and uses a phase mono-pulse method for measurement of bearing. As shown in FIG. 1, the radar apparatus of the first embodiment is composed of an oscillator 10, a directional coupler 11, a transmitting antenna 12, K receiving antennas 13-1 to 13-K, a switch 14, a mixer 15, a band-pass filter 16, an AD converter 17, and a signal processing device 18.

Next, there will be described the configurations of the constituent elements of the radar apparatus of the first embodiment and its operation.

Figure 2:
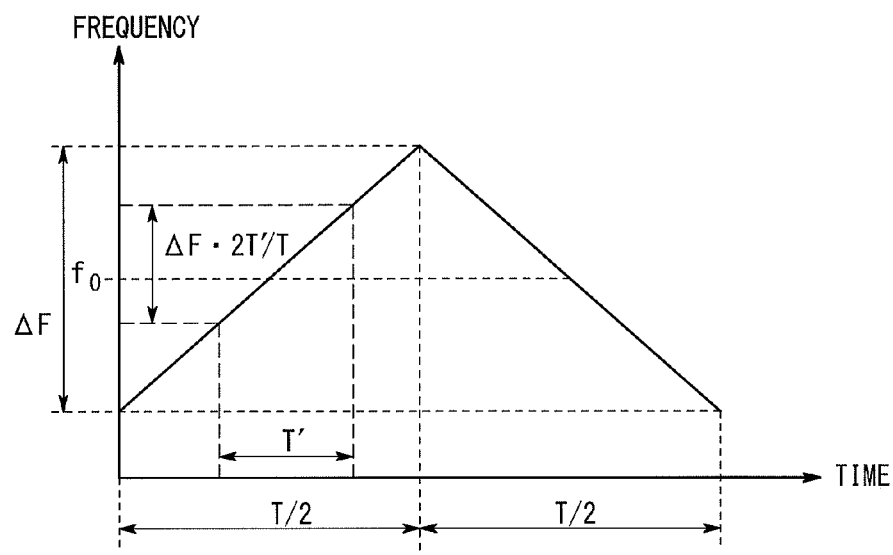
FIG. 2 is a graph showing a change in frequency of a signal with time.

As shown in FIG. 2, the oscillator 10 oscillates a frequency-modulated signal (transmission signal). Specifically, the transmission signal is a triangular wave which has a period T, a frequency change width $\Delta F$, and a center frequency f0. During a section of 0 to T/2, the frequency linearly increases with time by $\Delta F$. During a section of T/2 to T, the frequency linearly decreases with time by $\Delta F$. The oscillator 10 is connected to an input port of the directional coupler 11.

Notably, the transmission signal may be a sawtooth wave whose frequency increases or decreases linearly with time by $\Delta F$ during a period of 0 to T.

The transmission signal from the oscillator 10 is input to the directional coupler 11. An output port of the directional coupler 11 is connected to the transmitting antenna 12, and a coupling port thereof is connected to the mixer 15. The directional coupler 11 splits the transmission signal from the oscillator 10 into two signals which are output to the transmitting antenna 12 and the mixer 15.

The transmission signal is input from the oscillator 10 to the transmitting antenna 12 through the directional coupler 11, and a transmission wave is radiated from the transmitting antenna 12 as an electromagnetic wave. Each of the receiving antennas 13-1 to 13-K receives a reception wave, which is the transmission wave reflected by the object. A microstrip antenna or the like may be used for the transmitting antenna 12 and the receiving antennas 13-1 to 13-K.

The input side of the switch 14 is connected to the k receiving antennas 13-1 to 13-K, and its output side is connected to the mixer 15. Each of the receiving antennas 13-1 to 13-K is sequentially and repeatedly selected in a high speed in a predetermined very small interval by the switch 14. As a result the respective reception signals from the receiving antennas 13 are sampled every switching cycles and distributed in respective time channels corresponding to the respective receiving antennas 13-1 to 13-K. The signals distributed in the respective time channels are input to the mixer 15 in series.

The mixer 15 has two input terminals, which are connected to the coupling port of the directional coupler 11 and the output terminal of the switch 14. The mixer 15 mixes the transmission signal from the directional coupler 11 and the reception signal from the switch 14, and outputs a resultant signal. The signal output from the mixer 15 is passed through the band-pass filter 16, whereby a beat signal is obtained. The beat signal is a signal whose frequency is equal to the difference between the frequency of the transmission signal and the frequency of the reception signal. The beat signal is sampled by the AD converter 17 as a digital signal, and is input to the signal processing device 18. The digital signals which are distributed in the respective time channels are combined every signal of the receiving antennas 13-1 to 13-K and the respective beat signals of receiving antennas 13-1 to 13-K are obtained thereby in the signal processing device 18.

Figure 14:
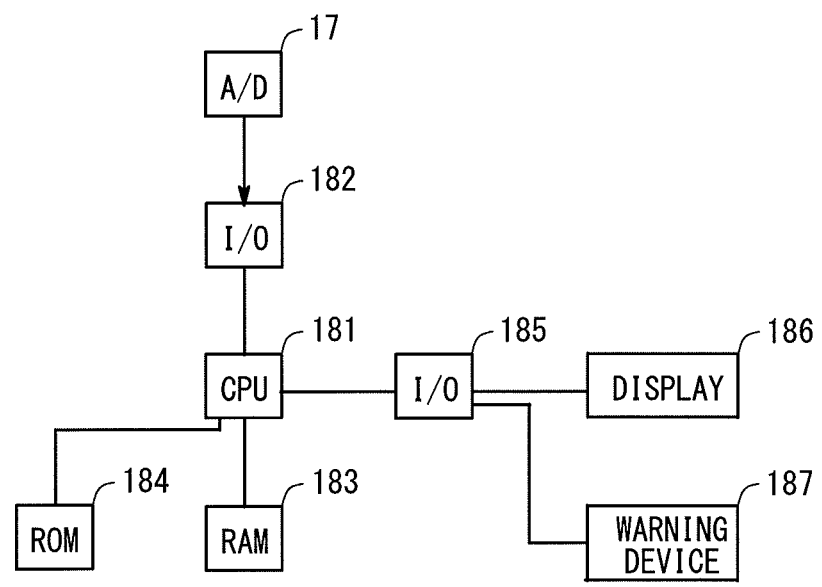
FIG. 14 is a block diagram showing the hardware configuration of a computer system used in a radar apparatus according to a first to fourth embodiment.

As shown in FIG. 1, the signal processing device 18 includes a first spectrum calculator 18a, a second spectrum calculator 18b, a grouping section (a grouping device) 18c, a change amount calculator 18d, a ratio calculator 18e, and a pedestrian determination section (pedestrian determination device) 18f. The beat signal is input to the first spectrum calculator 18a and the second spectrum calculator 18b, each of which calculates the frequency spectrum of the beat signal. On the basis of the frequency spectrum, the object is detected, and a determination is made as to whether or not the object is a pedestrian. Operations performed in the signal processing device 18 will be described in detail later. The signal processing device 18 can be realized by a computer system which includes a CPU 181, input/output interfaces 182 and 185, a ROM 184, a RAM 183, a display 186, and a warning device 187, etc., as shown in FIG. 14. By means of programs, the computer can perform various signal processing operations in the first spectrum calculator 18a, the second spectrum calculator 18b, the grouping section 18c, the change amount calculator 18d, the ratio calculator 18e, and the pedestrian determination section 18f. Notably, instead of providing the band-pass filter 16, the function of the band-pass filter 16 may be realized by digital processing in the signal processing device 18.

Next, the operation of the radar apparatus of the first embodiment will be described in the order of distance measurement, bearing measurement, grouping, and pedestrian determination.

[Distance Measurement]

In the radar apparatus of the first embodiment, in the signal processing device 18, FFT (fast Fourier transformation) is performed on the beat signal of the respective receiving antennas 13-1 to 13-K input to the signal processing device 18 so as to calculate frequency spectrums, and the distance L and velocity V of an object are measured from peak positions of the frequency spectrums. Specifically, the frequency spectrum of the beat signal in a frequency increasing section (the period of 0 to T/2 in FIG. 2) is calculated, and a beat frequency fu is obtained from the peak position thereof. Similarly, the frequency spectrum of the beat signal in a frequency decreasing section (the period of T/2 to T in FIG. 2) is calculated, and a beat frequency fd is obtained from the peak position thereof. The distance L can be calculated by $L=cT(fu+fd)/(8\Delta F)$, where c represents the velocity of light. The velocity V can be calculated by $V=c(fd-fu)/(4f0)$.

[Bearing Measurement]

The bearing of the object can be measured, in accordance with a DBF (Digital Beam Forming) method or a phase mono-pulse method, by receiving the reception signals from the receiving antennas 13 through switching of the switch 14. Also the bearing angle is decided by a difference of the phases of the frequency spectra between the adjacent two receiving antennas.

[Grouping]

In general, the object is a three-dimensional object having a certain size. Therefore, when the distance resolution is high, a plurality of reflection points may appear on the object. When ΔF is sufficiently large; i.e., when the distance resolution is sufficiently high, the frequency spectrum of the beat signal includes a plurality of peaks corresponding to the reflection points. For example, in the case of an on-board radar, the object is a vehicle or a pedestrian. In the case where the object is a pedestrian, the frequency spectrum includes one to five peaks. In order to correctly detect objects, the plurality of peaks must be grouped on an object-by-object basis.

In the radar apparatus of the first embodiment, the plurality of peaks are grouped by performing the following signal processing operation in the signal processing device 18.

The beat signal input to the signal processing device 18 is processed as follows by the first spectrum calculator 18a and the second spectrum calculator 18b.

The first spectrum calculator 18a performs FFT (fast Fourier transformation) while using the beat signal in the frequency increasing section or the frequency decreasing section (T/2), and calculates the frequency spectrum of the beat signal (hereinafter referred to as the "first frequency spectrum").

The second spectrum calculator 18b extracts a portion of the beat signal in the frequency increasing or decreasing section (T/2), the portion corresponding to a predetermined section T' smaller than T/2, performs FFT while using the extracted beat signal, and calculates a frequency spectrum (hereinafter referred to as the "second spectrum"). The length of the section T' is set to a proper value in accordance with the structure of the radar, measurement environment, the type of object, etc.

Notably, a method other than FFT may be used for frequency analysis by the first spectrum calculator 18a and the second spectrum calculator 18b.

The grouping section 18c detects and compares peaks of the first spectrum and peaks of the second spectrum. For each peak of the second spectrum, a plurality of peaks of the first spectrum which are contained in (correspond to) the peak of the second spectrum are grouped into a single group.

The beat signal in the section T' used for calculation of the second spectrum corresponds to a beat signal obtained when the frequency change width of the transmission signal is set to ΔF·2T'/T (see FIG. 2). Since the frequency change width is smaller than the frequency change width ΔF, the frequency resolution decreases, and peaks which can be separated in the first spectrum become unable to be separated in the second spectrum. Namely, the first spectrum includes a plurality of peaks, because a plurality of reflection points are present on each object. In contrast, in the second spectrum, which is low in resolution, a plurality of reflection points on each object become undistinguishable. Therefore, the second spectrum has a single peak for each object. From the above, it can be said that a group of peaks of the first spectrum which are included in a certain peak of the second spectrum when the first spectrum and the second spectrum are superimposed together originate from a certain object. Accordingly, the grouping can be performed by grouping the peaks of the first spectrum into such peak groups.

Determination as to whether or not peaks of the first spectrum are included in a peak of the second spectrum is made as follows, for example. First, two local minimums present immediately before and after a peak of the second spectrum are extracted. In the case where no local minimums are present, points at which power becomes equal to or less than a predetermined threshold are extracted. Peaks of the first spectrum which are present between the two local minimums in the second spectrum are determined to be included in the peak of the second spectrum. The determination as to whether or not peaks of the first spectrum are included in a peak of the second spectrum can be made by using, for example, the half-value width of the peak of the second spectrum as a reference.

Figure 3:
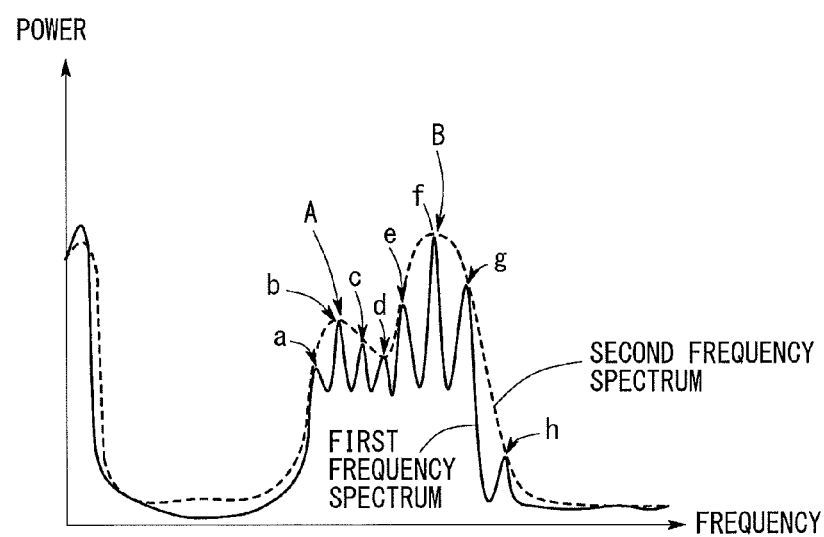
FIG. 3 is a graph showing examples of first and second spectrums.

FIG. 3 is a graph showing examples of the first spectrum and the second spectrum. The above-described method of grouping will be described with reference to FIG. 3. In the first spectrum shown in FIG. 3, eight peaks a to h appear in this order from the low frequency side. Since the peak at a frequency near 0 is produced due to, for example, sneaking of the transmission wave, that peak is ignored here. Meanwhile, in the second spectrum, two peaks A and B appear in this order from the low frequency side. Four peaks a to d of the first spectrum are present between the local minimums of the peak A on the low frequency side. Therefore, these four peaks a to d are grouped into a single group. Also, four peaks e to h of the first spectrum are present between the local minimums of the peak B on the high frequency side. Therefore, these four peaks e to h are grouped into a single group. By the above-described procedure, the eight peaks of the first spectrum are grouped into two peak groups.

In the above-described grouping, it is possible to additionally use grouping performed on the basis of the result of detection of the bearing. The grouping based on the result of detection of the bearing can be performed by, for example, grouping peaks present within a predetermined bearing angle range into a single group. The result of the above-described grouping may be corrected, or the obtained group may be divided into subgroups by performing the grouping based on the result of detection of the bearing. Also, the load of the above-described grouping process can be reduced by performing the above-described grouping after performing the grouping based on the result of detection of the bearing. Needless to say, it may be the case that only the grouping based on the result of detection of the bearing is performed, and other grouping methods may be used.

Also, in the case where the velocity is measured, it is necessary to perform an operation (called pairing) of establishing one-to-one correspondence between the peaks of the frequency spectrum in the frequency increasing section and the peaks of the frequency spectrum in the frequency decreasing section. When the above-described grouping is performed first, the pairing operation is only required to search peaks to be paired within the same group. Therefore, the load of the pairing processing can be reduced.

[Pedestrian Determination]

Next, determination as to whether or not each object measured by the radar apparatus of the first embodiment is a pedestrian will be described with reference to the flowchart of FIG. 12.

[Step S1]

First, the change amount calculator 18d obtains the peak values of a plurality of peaks which are present in the first spectrum and which belong to the same group. When an object is moving, the corresponding peak positions, i.e., the frequency of the peak, are also moving. Therefore, the changing positions of the peaks are predicted from the velocity of the measured object, and peaks present at the predicted positions are considered to be peaks of the same group. The peak values, i.e., the intensity of the reception wave, are stored every time the first spectrum is calculated. A peak value at the present point in time is compared with the corresponding peak value obtained before the present point in time, and the difference between the two peak values is calculated. Comparison is made between the peaks from the same reflection point of the object. In the case where it is difficult to determine whether or not two peaks are those from the same reflection point, peak-to-peak correspondence may be established in ascending order of peak position (since the first spectrum is a frequency spectrum, in ascending order of frequency). In the radar apparatus of the first embodiment, since the first spectrum in the frequency increasing or decreasing section is calculated at intervals of T, the peak value obtained before the present point in time is a peak value obtained at a point at least a period of time T earlier than the present point in time, and may be a peak value obtained at a point earlier than the present point in time by 2T or 3T.

Notably, in the radar apparatus of the first embodiment, the difference between the peak value at the present point in time and the peak value obtained before the present point in time is obtained. However, a quantity which represents a change in the peak value may be used instead of the difference. For example, instead of the difference, standard deviation, standard error, time derivative, with respect to peaks varied with time, or the like may be used. Also, a plurality of values among the above-mentioned values may be taken into consideration. Although the time derivative or the like provides the sign (plus or minus) of the difference, the standard deviation, the standard error, or the like does not provide the sign of the difference. Therefore, the sign of the difference must be determined separately.

Also, in the case where the number of the peaks within the same group increases or decreases; namely, in the case where the number of peaks at the present point in time differs from the number of peaks before the present point in time, the difference calculation cannot be performed for a peak which does not have a counterpart peak. In such a case, the peak which does not have a counterpart peak is removed from the peaks for which comparison is performed. However, in the case where the counterpart peak appears in the next or subsequent operation cycle, the peak and the counterpart peak are added to the peaks for which comparison is performed.

[Step S2]

Next, the ratio calculator 18$e$ compares the absolute value of the difference obtained by the change amount calculator 18$d$ with a predetermined difference threshold, and determines whether or not the absolute value of the difference is greater than the difference threshold. The ratio calculator 18$e$ then calculates the ratio of the number of peaks whose differences (absolute values) are greater than the difference threshold to the total number of peaks belonging to the same group.

[Steps S3 to S6]

Next, the pedestrian determination section 18$f$ determines whether or not the object is a pedestrian, as follows. First, the pedestrian determination section 18$f$ determines whether or not the ratio calculated by the ratio calculator 18$e$ is greater than a predetermined ratio threshold (step S3). In the case where the ratio is not greater than the ratio threshold, the pedestrian determination section 18$f$ determines that the object is not a pedestrian (step S4). In the case where the ratio is greater than the ratio threshold, the pedestrian determination section 18$f$ determines whether or not the differences of peaks belonging to the same group have the same sign (step S5). In the case where the differences have the same sign, the pedestrian determination section 18$f$ determines that the object is not a pedestrian (step S4). In the case where not all the differences have the same sign; namely, in the case where at least one peak differs from the remaining peaks in terms of the sign of the difference, the pedestrian determination section 18$f$ determines that the object is a pedestrian (step S6). When the object is determined as a pedestrian, a warning device 187 is driven to warn a driver. A bearing angle of the pedestrian and a distance to the pedestrian are output on the display 186. A control signal is output to perform speed control by brake operation or handle control for avoiding the pedestrian. By the above-described processing, the determination as to whether the object is a pedestrian is made. Notably, the order of the determination steps S3 and S5 may be reversed.

[Specific Example of Pedestrian Determination]

The pedestrian determination will be specifically described with reference to the flowchart of FIG. 12 for the case where the first and second spectrums are those shown in FIGS. 13A and 13B. FIG. 13A shows the first and second spectrums at a certain time t−1, and FIG. 13B shows the first and second spectrums at a certain time t. As shown in FIG. 13A, peaks $p1_{t-1}$, $p2_{t-1}$, and $p3_{t-1}$ of the first spectrum which are contained in a peak $P_{t-1}$ of the second spectrum belong to the same group. As shown in FIG. 13B, a peak $P_{t-1}$ becomes a peak $P_t$ of the second spectrum at time t; i.e., after elapse of a predetermined period of time after the time t−1, and the peaks $p1_t$, $p2_t$, and $p3_t$ contained in the peak $P_t$ correspond to the peaks $p1_{t-1}$, $p2_{t-1}$, and $p3_{t-1}$, respectively.

In this case, in step S1, the difference $d_1$ between the peaks $p1_t$ and $p1_{t-1}$, the difference $d_2$ between the peaks $p2_t$ and $p2_{t-1}$, and the difference $d_3$ between the peaks $p3_t$ and $p3_{t-1}$ are calculated. In step S2, a determination is made as to whether the absolute values of the differences $d_1$, $d_2$, and $d_3$ are greater than the difference threshold. As shown in FIG. 13B, the absolute values of the differences $d_1$ and $d_2$ are large, and the absolute value of the difference $d_3$ is very small. Here, it is assumed that the absolute values of the differences $d_1$ and $d_2$ are greater than the difference threshold. In such a case, the ratio of the number of peaks whose differences are greater than the difference threshold to the total number of peaks is 2/3. In step S3, a determination is made as to whether or not this ratio of 2/3 is greater than the ratio threshold. In step S5, the difference $d_1$ is determined to be positive (plus) and the difference $d_2$ is determined to be negative (minus). Therefore, at least one peak differs from the remaining peaks in terms of the sign of the difference. Accordingly, when the ratio threshold is 1/3, the object is determined to be a pedestrian in step S6, and when the ratio threshold is 2/3 or 3/3, the object is determined not to be a pedestrian in step S4.

[Reason why Pedestrian Determination is Possible]

Figure 12:
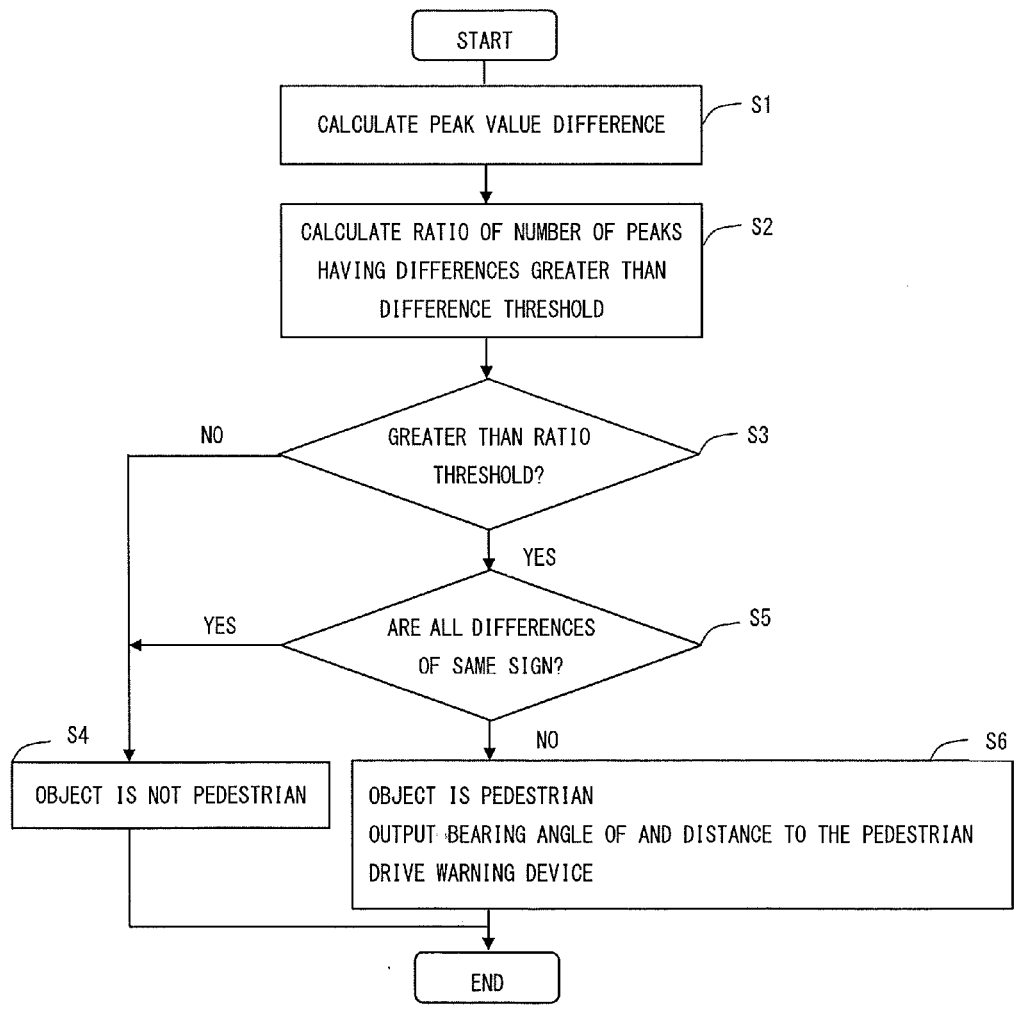
FIG. 12 is a flowchart of a pedestrian determination operation.
Figure 13A:
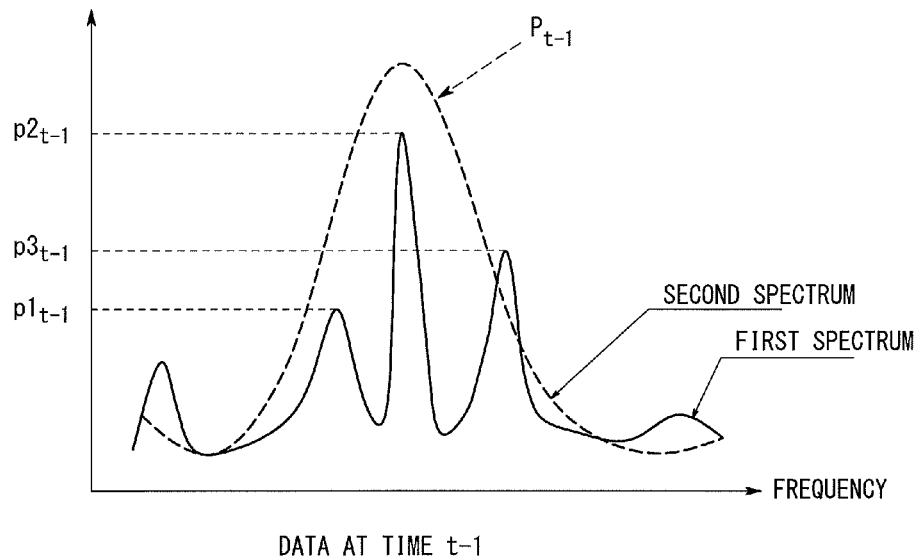
FIGS. 13A and 13B are graphs showing examples of first and second spectrums.
Figure 13B:
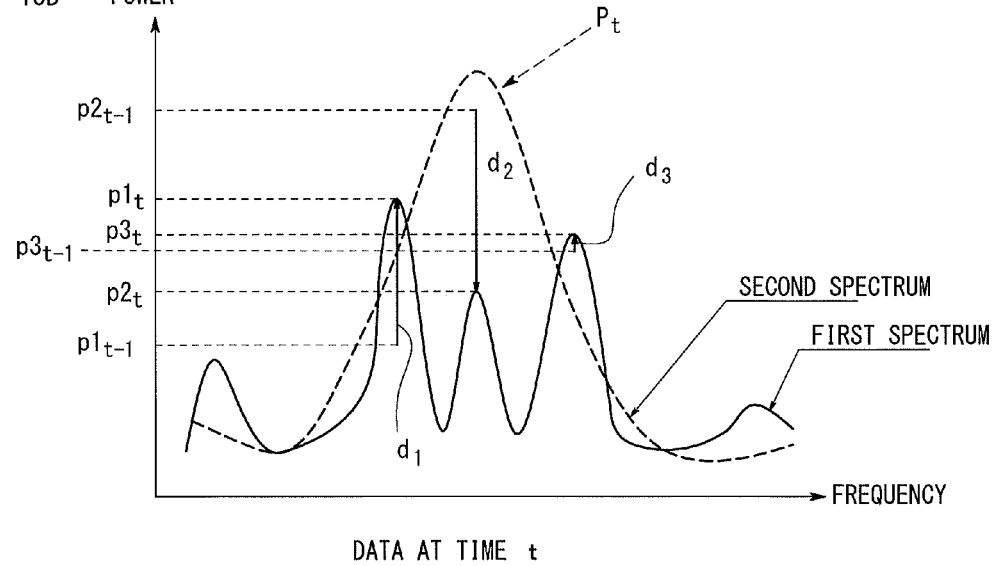

The object can be determined to be a pedestrian by the flowchart of FIG. 12 for the following two reasons.

First, unlike other targets (objects) such as a vehicle, a pedestrian moves slightly due to breathing or the like. Therefore, the reflection points at which the transmission wave from the radar apparatus are reflected always change. Therefore, in the case where reflection signals which change greatly with time account for a large portion of a plurality of reflection signals obtained from one object; namely, in the case where the peaks of the first spectrum change greatly with time, the object is highly likely to be a pedestrian. This is the reason why the processing of step S3 in the flowchart of FIG. 12 is performed.

Second, unlike movement of a vehicle or a like object, reflection positions on a pedestrian frequently change due to, for example, a change in walking posture or a change in the direction of the body. Therefore, a peak whose peak value increases with time and a peak whose peak value decreases with time are highly likely to appear simultaneously. Meanwhile, in the case of an object other than a pedestrian, reflection positions do not move greatly within a short period of time, and the peak values of all the peaks from the object increase or decrease simultaneously. For this reason, the processing of step S5 in the flowchart of FIG. 12 is performed.

Notably, the difference threshold and the ratio threshold are set to proper values in consideration of the structure of the radar apparatus, measurement environment, etc. The value of the difference threshold or the ratio threshold may be changed, whenever necessary, in accordance with a change in the measurement environment.

According to the radar apparatus of the first embodiment, the determination as to whether or not an object is a pedestrian can be realized at low cost.

Second Embodiment

Figure 4:
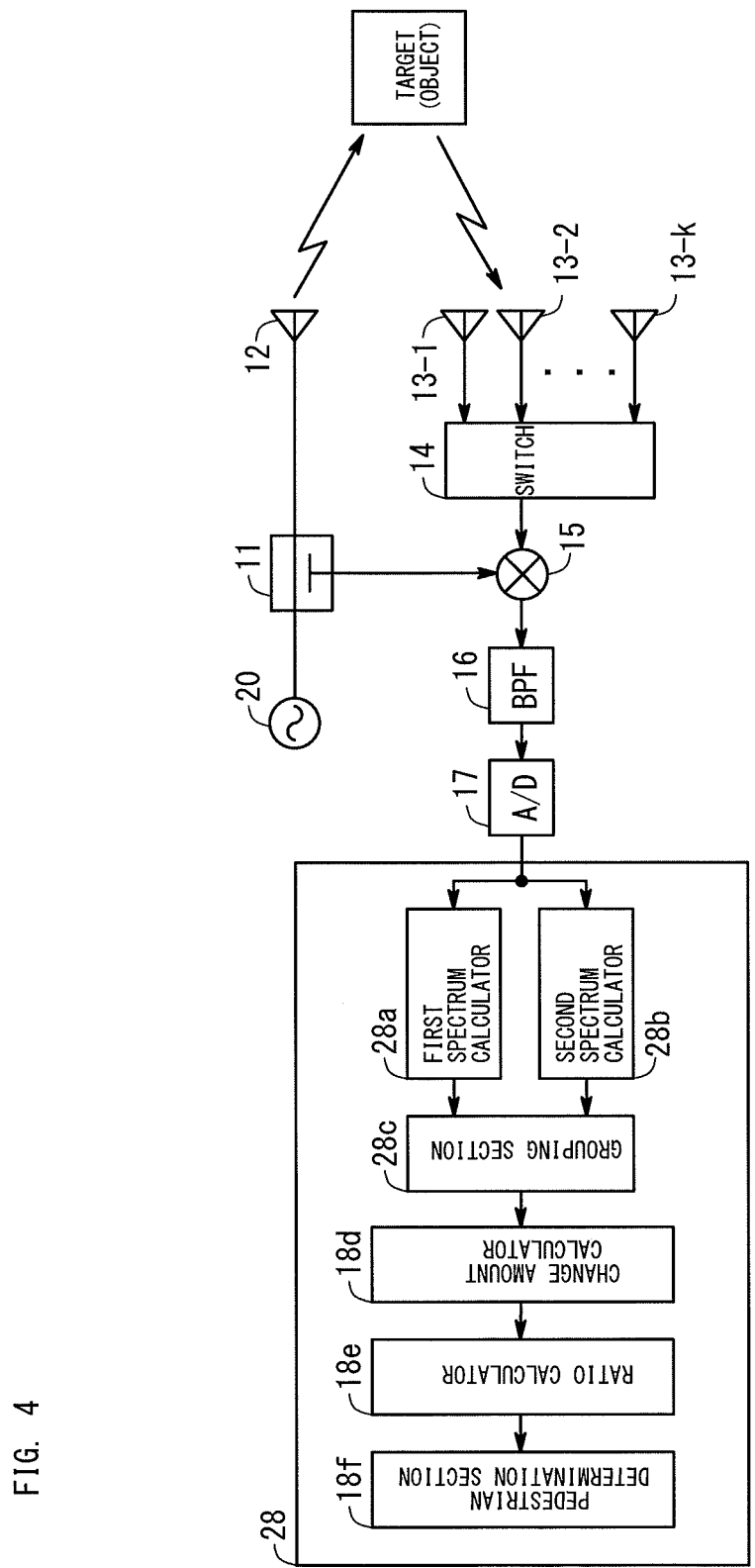
FIG. 4 is a block diagram showing the configuration of a radar apparatus according to a second embodiment.

FIG. 4 is a block diagram showing the configuration of a radar apparatus according to a second embodiment. The radar apparatus of the second embodiment measures distance and velocity by a multi-frequency CW method. As shown in FIG. 4, the radar apparatus of the second embodiment has the same configuration as that of the radar apparatus of the first embodiment except that the oscillator 10 and the signal processing device 18 of the radar apparatus of the first embodiment are replaced with an oscillator 20 and a signal processing device 28, respectively.

Figure 5:
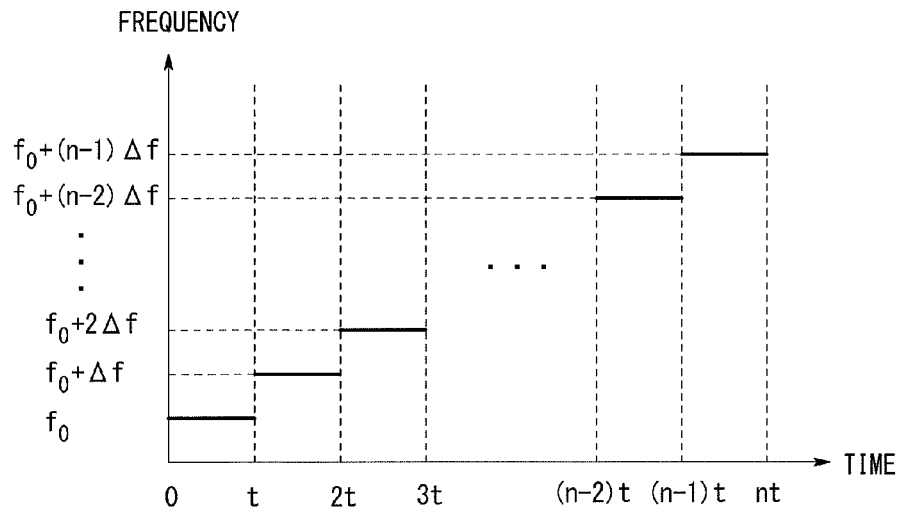
FIG. 5 is a graph showing a change in frequency of a signal with time.

The oscillator 20 oscillates a transmission signal whose frequency changes as shown in FIG. 5. The oscillator 20 repeats an operation of increasing the frequency of the transmission signal stepwise with time and returning the frequency to its initial value. As shown in FIG. 5, the frequency increases stepwise from $f_0$ (initial value) to $f_0+\Delta f$, then to $f_0+2\Delta f$; i.e., at an increment of $\Delta f$, at time intervals t. When the number of steps reach n (n is a natural number equal to or greater than 4), the frequency of the transmission signal returns to the original frequency $f_0$. A signal whose frequency decreases stepwise with time in contrast to the above-described signal may be used as the transmission signal. Alternatively, a signal whose frequency repeats stepwise increase and stepwise decrease may be used.

The signal processing device 28 includes first spectrum calculator 28a, second spectrum calculator 28b, and a grouping section 28c which will be described below and which replace the first spectrum calculator 18a, the second spectrum calculator 18b, and the grouping section 18c which are provided in the signal processing device 18 of the radar apparatus of the first embodiment. Change amount calculator 18d, ratio calculator 18e, and pedestrian determination section 18f are the same as those in the first embodiment.

Figure 6:
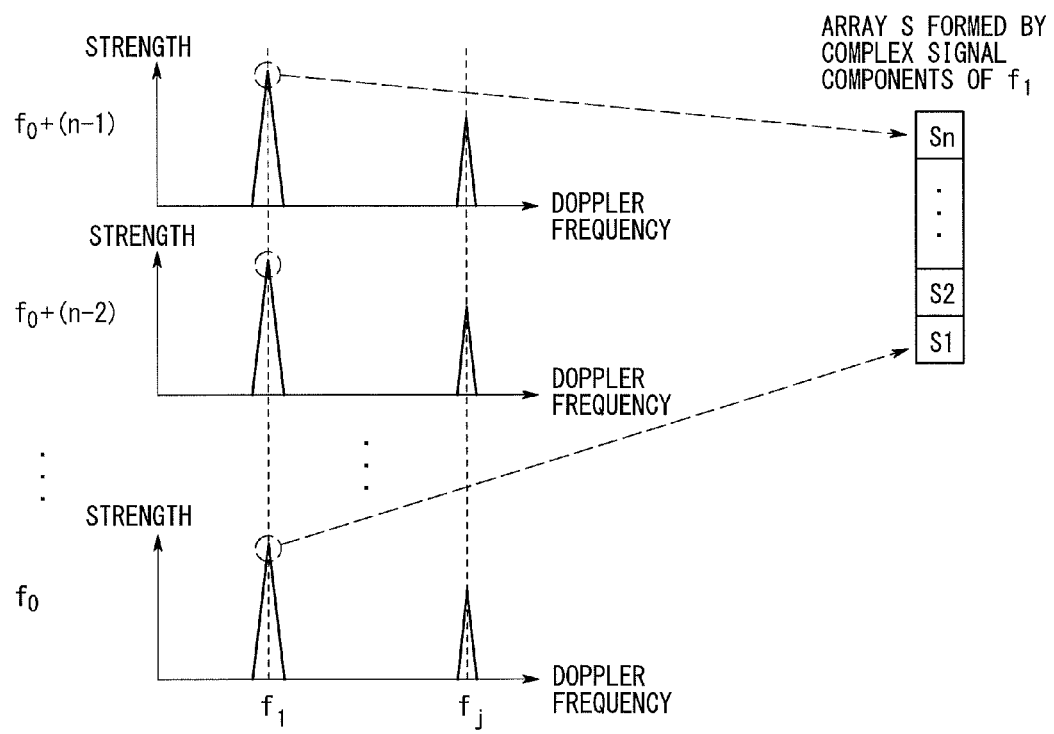
FIG. 6 is a graph showing a frequency spectrum in each step.

In the radar apparatus of the second embodiment, in each step, frequency analysis is performed on the beat signal to thereby calculate a frequency spectrum, and a phase difference is obtained from the frequency spectrums, whereby the distance is calculated. Its specific method is as follows (see FIG. 6). Corresponding peak values are extracted from the frequency spectrums such that one peak value is extracted from one frequency spectrum and n peak values are obtained in total. The peak value is a complex value including a phase value corresponding to the phase difference between the transmission wave and the reception wave. The phase $\theta_k$ in k step is represented by $\theta_k=2\pi\cdot(2R/c)\cdot(f_0+k\Delta f)$, where R is the distance to an object and c is the velocity of light. The extracted peak values are arranged in ascending order of step number k, to thereby form an array S. The array S is then Fourier-transformed in the frequency step direction, i.e., increasing direction of k, whereby the spectrum with respect to 2R/c is obtained. The peak of the spectrum is extracted and the distance R of the object is calculated. Notably, the frequency spectrum obtained by performing frequency analysis on the beat signal shows the Doppler frequency, and a difference in peak position of the frequency spectrum shows a difference in velocity. Therefore, objects which are the same in distance and differ in velocity can be detected separately. In the case of FIG. 6, peak values at a Doppler frequency $f_i$ and peak values at a Doppler frequency $f_j$ are used to form respective arrays S, whereby the distances of the respective objects can be detected separately.

Even in the case of the radar apparatus of the second embodiment, when $\Delta f$ or the number n of steps is large, each object may have a plurality of reflection points. In such a case, the spectrum obtained by Fourier transformation with respect to k of the array S has a plurality of peaks. In view of this, in the radar apparatus of the second embodiment, grouping is performed as follows.

First, the first spectrum calculator 28a of the signal processing device 28 performs FFT with respect to time of the beat signal in each step, to thereby calculate a frequency spectrum. Peak values at the same Doppler frequency are extracted from the frequency spectrums so that one peak value is extracted from one frequency spectrum and n peak values are extracted in total. These peak values are arranged in ascending order of step number k to thereby form an array S. In the case where a plurality of objects which differ in velocity are present, the array S is formed on a velocity-by-velocity basis. The array S is subjected to FFT with respect to k, i.e., $f_0+k\Delta f$, whereby a spectrum with respect to distance R (hereinafter referred to as the "first spectrum") is calculated.

Next, the second spectrum calculator 28b of the signal processing device 28 extracts a portion of the array S. Namely, of the n elements of the array S, a predetermined number n' of elements (n'<n) are extracted so as to form an array S'. In the same manner as described above, a spectrum with respect to distance R (hereinafter referred to as the "second spectrum") is calculated by using this array S'. The number n' of elements of the array S' is set to a proper value in accordance with the structure of the radar, measurement environment, the type of object, etc.

Next, the grouping section 28c of the signal processing device 28 performs grouping in the same manner as in the case of the grouping section 18c of the radar apparatus of the first embodiment. Namely, the peaks of the first and second spectrums are detected and compared. For each peak of the second spectrum, a plurality of peaks of the first spectrum which are contained in the peak of the second spectrum are grouped into a single group. The determination as to whether not peaks of the first spectrum are contained in a peak of the second spectrum is made in the same manner as in the first embodiment.

The reason why grouping can be performed by the above-described method is the same as the reason mentioned for the first embodiment. In the distance measurement by the multi-frequency CW method, the frequency modulation width $\Delta F$ of the transmission signal; i.e., $\Delta f\cdot n$ determines the distance resolution. Since the array S' is formed by extracting a portion of the elements of the array S, it corresponds to an operation of decreasing the frequency modulation width of the transmission signal to $\Delta f \cdot n'$. Accordingly, when the array S' is used, the distance resolution becomes lower as compared with the case where the array S is used. As a result, in the second spectrum, a plurality of reflection points on each object become undistinguishable. Therefore, the second spectrum has a single peak for each object. From the above, it can be said that a group of peaks of the first spectrum which are included in a certain peak of the second spectrum originate from a plurality of reflection points on a certain object. Accordingly, grouping can be performed by the above-described method.

The determination as to whether or not an object is a pedestrian can be performed in the same manner as in the radar apparatus of the first embodiment. Namely, for a plurality of peaks of the first spectrum grouped by the grouping section 28c for each object, the change amount calculator 18d, the ratio calculator 18e, and the pedestrian determination section 18f of the signal processing device 28 perform processing in accordance with the flowchart of FIG. 12. Thus, the determination as to whether or not an object is a pedestrian can be performed.

Like the radar apparatus of the first embodiment, the radar apparatus of the second embodiment can accurately perform grouping and can determine whether or not an object is a pedestrian.

Third Embodiment

Figure 7:
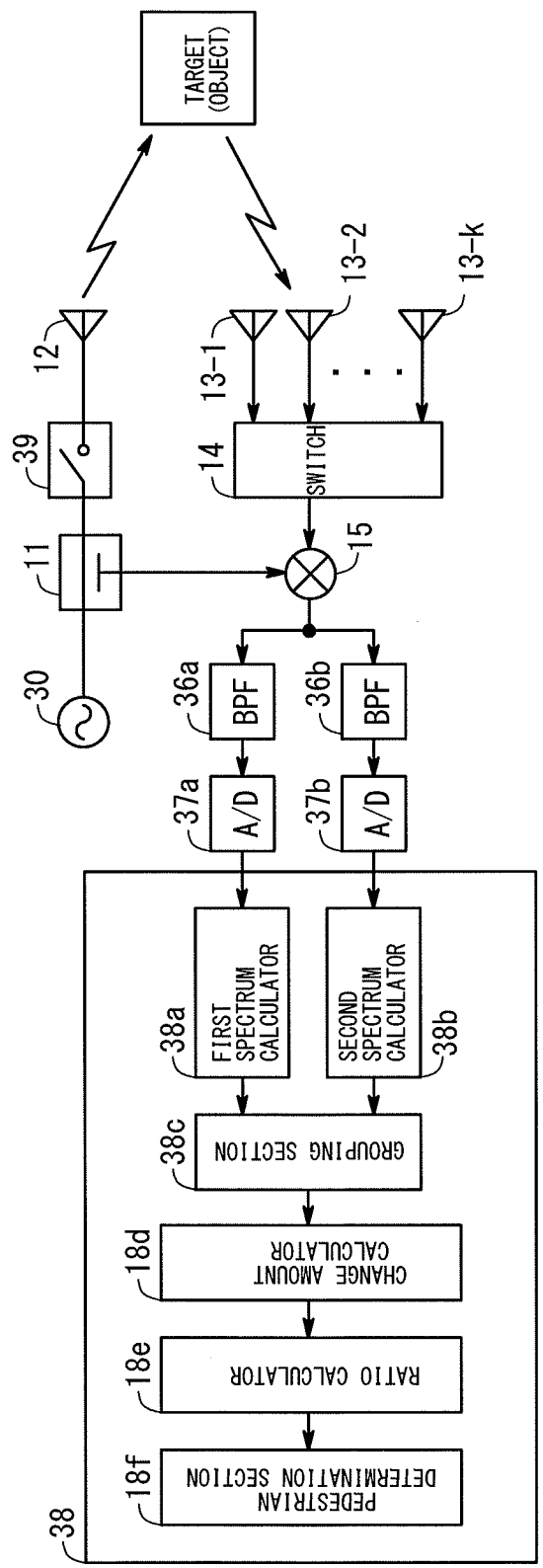
FIG. 7 is a block diagram showing the configuration of a radar apparatus according to a third embodiment.

FIG. 7 is a block diagram showing the configuration of a radar apparatus according to a third embodiment. The radar apparatus of the third embodiment performs distance measurement by a pulse method. Namely, the radar apparatus of the third embodiment measures the distance between the radar apparatus and an object from a time delay of a pulse. As shown in FIG. 7, the radar apparatus of the third embodiment has the same configuration as that of the radar apparatus of the first embodiment except that the oscillator 10 is replaced with an oscillator 30, a switch 39 is provided between the directional coupler 11 and the transmitting antenna 12, and the components and section on the output side of the mixer 15 are replaced with band-pass filters 36a and 36b, AD converters 37a and 37b, and a signal processing device 38. Portions different from those of the first embodiment are described below.

Figure 8:
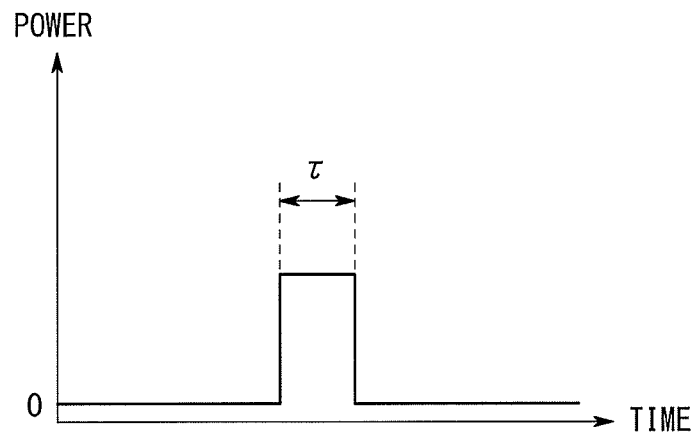
FIG. 8 is a graph showing a time waveform of a transmission signal.

The oscillator 30 oscillates a signal of a continuous wave having a predetermined frequency. The switch 39 conducts and blocks the signal from the directional coupler 11 at predetermined intervals. This switch 39 converts the signal from the oscillator 30 into a pulse signal containing pulses each having a pulse width $\tau$ (see FIG. 8). Thus, a pulse-shaped transmission wave is transmitted from the transmitting antenna 12.

The output side of the mixer 15 is connected to the band-pass filters 36a and 36b. Therefore, the signal output from the mixer 15 is input to both the band-pass filters 36a and 36b. The band-pass filter 36a is similar to the band-pass filter 16a. Therefore, a signal within a predetermined band passes through the band-pass filter 36a. A band-pass filter whose band width is narrower than that of the band-pass filter 36a is used for the band-pass filter 36b. The output sides of the band-pass filters 36a and 36b are connected to the signal processing device 38 through the AD converters 37a and 37b. Notably, the band width of the band-pass filter 36b is set to a proper value in accordance with the structure of the radar apparatus, measurement environment, the type of object, etc.

As shown in FIG. 7, the signal processing device 38 includes first spectrum calculator 38a, second spectrum calculator 38b, a grouping section 38c, change amount calculator 18d, ratio calculator 18e, and pedestrian determination section 18f. The signals from the band-pass filters 36a and 36b are input to the first spectrum calculator 38a and the second spectrum calculator 38b, respectively. The change amount calculator 18d, the ratio calculator 18e, and the pedestrian determination section 18f are the same as those employed in the first embodiment.

Even in the case of the radar apparatus of the third embodiment, when the pulse width $\tau$ is small, each object may have a plurality of reflection points. In such a case, a first time waveform detected by the first spectrum calculator 38a has a plurality of peaks. In view of this, in the radar apparatus of the third embodiment, grouping is performed as follows.

First, the first spectrum calculator 38a detects a time waveform (hereinafter referred to as the "first time waveform") of the signal from the band-pass filter 36a. Similarly, the second spectrum calculator 38b detects a time waveform (hereinafter referred to as the "second time waveform") of the signal from the band-pass filter 36b.

Next, the grouping section 38c of the signal processing device 38 extracts the peaks of the first and second time waveforms. The grouping section 38c compares the positions of the peaks of the first and second time waveforms. For each peak of the second time waveform, the grouping section 38c groups, into a single group, a plurality of peaks of the first time waveform which are contained in the peak of the second spectrum. The determination as to whether not peaks of the first spectrum are contained in a peak of the second spectrum is made in the same manner as in the first embodiment and the second embodiment.

Figure 9:
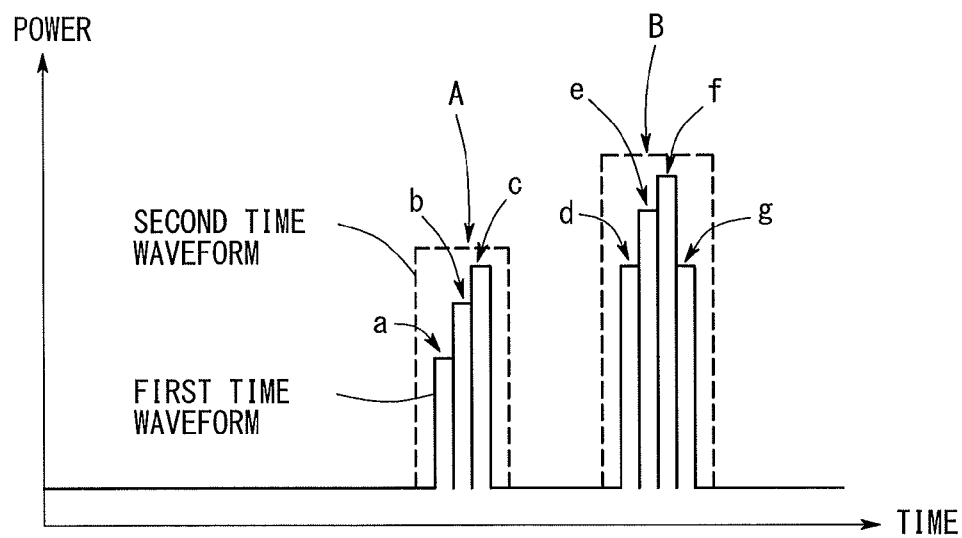
FIG. 9 is a graph showing examples of first and second time waveforms.

The above-described grouping will be described specifically with reference to examples of the first and second time waveforms shown in FIG. 9. In the examples shown in FIG. 9, the second time waveform has two peaks A and B. The first time waveform has seven peaks a to g. The peak A of the second time waveform contains the peaks a to c of the first time waveform, and the peak B of the second time waveform contains the peaks d to g of the first time waveform. Therefore, of the seven peaks of the first time waveform, the peaks a to c are grouped into a group, and the peaks d to g are grouped into another group.

The reason why accurate grouping can be performed by the above-described method is the same as the reason mentioned for the first embodiment. In the distance measurement by the pulse method, the pulse width determines the distance resolution, and the greater the pulse width, the lower the distance resolution.

The pulse width of the pulse is in inverse proportion to the frequency band. Also, the band width of the band-pass filter 36b is narrower than that of the band-pass filter 36a. Therefore, the signal output from the band-pass filter 36b has a pulse width greater than that of the signal output from the band-pass filter 36a.

Accordingly, the time waveform of the signal output from the band-pass filter 36b is lower in distance resolution (time resolution) than the signal output from the band-pass filter 36a. As a result, in the second time waveform, a plurality of reflection points on each object become undistinguishable. Therefore, the second time waveform has a single peak for each object. From the above, it can be said that a group of peaks of the first time waveform which are included in a certain peak of the second time waveform originate from a plurality of reflection points on a certain object. Accordingly, grouping can be performed by the above-described method.

The determination as to whether or not an object is a pedestrian in the radar apparatus of the third embodiment can be performed in the same manner as in the radar apparatus of the first embodiment. Namely, for a plurality of peaks of the first spectrum grouped by the grouping section 38c of the signal processing device 38 for each object, the change amount calculator 18d, the ratio calculator 18e, and the pedestrian determination section 18f of the signal processing device 38 perform processing in accordance with the flowchart of FIG. 12. Thus, the determination as to whether or not an object is a pedestrian can be performed.

Like the radar apparatuses of the first and second embodiments, the radar apparatus of the third embodiment can accurately perform grouping and can determine whether or not an object is a pedestrian.

Fourth Embodiment

Figure 10:
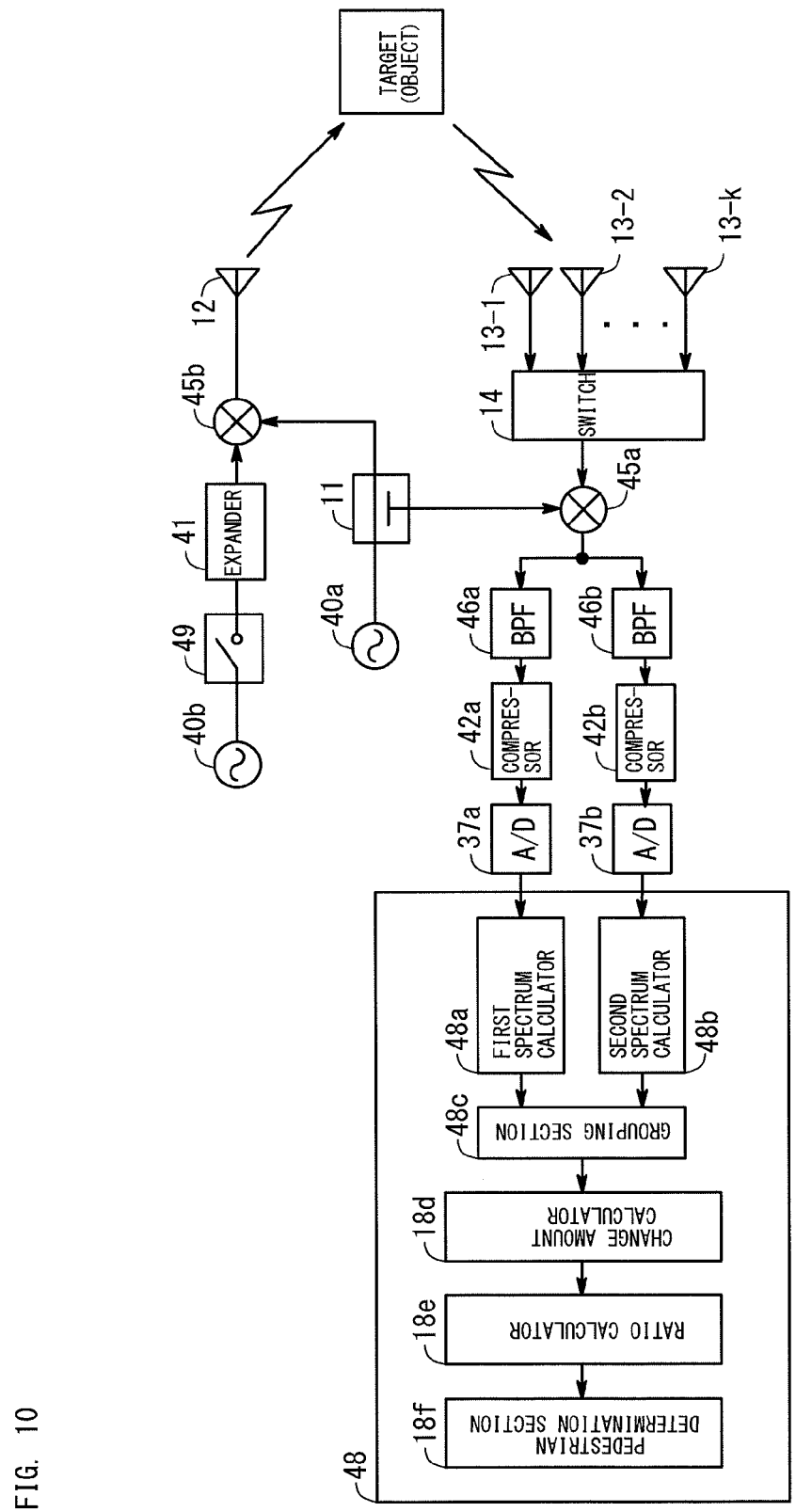
FIG. 10 is a block diagram showing the configuration of a radar apparatus according to a fourth embodiment.

FIG. 10 is a block diagram showing the configuration of a radar apparatus according to a fourth embodiment. The radar apparatus of the fourth embodiment performs distance measurement by a pulse compression method. As shown in FIG. 10, the radar apparatus of the fourth embodiment includes oscillators 40a and 40b, switches 14 and 49, an expander 41, a directional coupler 11, mixers 45a and 45b, a transmitting antenna 12, receiving antennas 13-1 to 13-K, band-pass filters 46a and 46b, compressors 42a and 42b, AD converters 37a and 37b, and a signal processing device 48. Notably, portions having the same configurations as those of the radar apparatus of the third embodiment are denoted by the same reference numerals.

Next, there will be described more specifically the configurations of the constituent elements of the radar apparatus of the fourth embodiment and its operation.

The signal from the oscillator 40b is input to the switch 49. The switch 49 conducts and blocks the signal from the oscillator 40b at predetermined intervals. This switch 49 converts the signal from the oscillator 40b into a pulse signal including pulses having a pulse width $\tau$.

Figure 11:
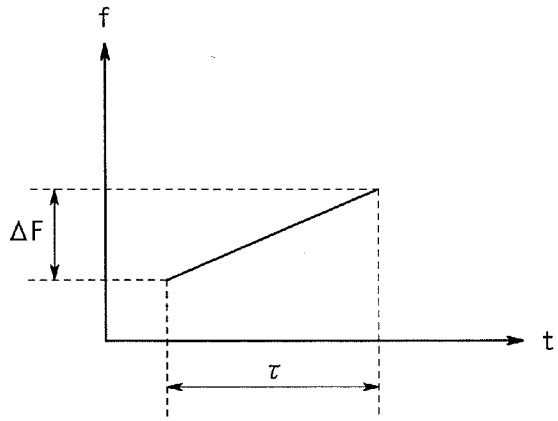
FIG. 11 is a graph showing a change in frequency of a signal with time.

The expander 41 frequency-modulates the pulse signal from the switch 49 such that the frequency of the signal linearly increases by $\Delta F$ during a period of time $\tau$ (see FIG. 11).

The signal from the oscillator 40a is input to the mixers 45a and 45b through the directional coupler 11. The mixer 45b mixes the signal from the oscillator 40a and the signal from the expander 41 so as to output a frequency-converted signal. The output side of the mixer 45b is connected to the transmitting antenna 12.

Since the transmitting antenna 12, the receiving antenna 13-1 to 13-K, and the switch 14 operate in the same manner as in the third embodiment, their descriptions are omitted.

The mixer 45a receives the reception signal from the switch 14 and the signal from the oscillator 40a. The mixer 45a mixes these two signals. The resultant signal is passed through the band-pass filters 46a and 46b, whereby it is converted to signals in the base band. A band-pass filter whose band width is narrower than that of the band-pass filter 46a is used for the band-pass filter 46b.

The signals from the band-pass filters 46a and 46b are input to the compressors 42a and 42b, respectively. The compressors 42a and 42b are filters whose frequency characteristic for delay time is reversal to that of the expander 41 in terms of increase and decrease of delay time. The pulse widths of the input signals are compressed from $\tau$ to $1/\Delta F$ by the compressors 42a and 42b, and the amplitudes of the input signals are increased to $(\tau \cdot \Delta F)^{1/2}$.

As described above, in the radar apparatus of the fourth embodiment, through employment of the expander 41 and the compressors 42a and 42b, it becomes possible to make the pulse width $\tau$ relatively large at the time of transmission of a signal so as to increase the average power to thereby secure a sufficiently large detection distance, and to compress the pulse width at the time of reception of the signal to thereby increase the distance resolution.

As shown in FIG. 10, the signal processing device 48 includes first spectrum calculator 48a, second spectrum calculator 48b, a grouping section 48c, change amount calculator 18d, ratio calculator 18e, and pedestrian determination section 18f. The signals output from the compressors 42a and 42b are input to the first spectrum calculator 48a and the second spectrum calculator 48b, respectively. The change amount calculator 18d, the ratio calculator 18e, and the pedestrian determination section 18f are the same as those employed in the first embodiment.

The radar apparatus of the fourth embodiment performs grouping in the same manner as in the radar apparatus of the third embodiment. Namely, the first spectrum calculator 48a obtains a time waveform (first time waveform) of the input signal, and the second spectrum calculator 48b obtains a time waveform (second time waveform) of the input signal. The grouping section 48c extracts the peaks of the first and second time waveforms. The grouping section 48c compares the positions of the peaks of the first and second time waveforms. For each peak of the second time waveform, the grouping section 48c groups, into a single group, a plurality of peaks of the first time waveform which are contained in the peak of the second spectrum.

The reason why accurate grouping can be performed by the above-described method is the same as the reason mentioned for the third embodiment. Since the band width of the band-pass filter 46b is narrower than that of the band-pass filter 46a, the signal input to the second spectrum calculator 48b becomes lower in distance resolution than the signal input to the first spectrum calculator 48a. Therefore, accurate grouping can be performed.

The determination as to whether or not an object is a pedestrian in the radar apparatus of the fourth embodiment can be performed in the same manner as in the radar apparatus of the first embodiment. Namely, for a plurality of peaks of the first spectrum grouped by the grouping section 48c for each object, the change amount calculator 18d, the ratio calculator 18e, and the pedestrian determination section 18f of the signal processing device 48 perform processing in accordance with the flowchart of FIG. 12. Thus, the determination as to whether or not an object is a pedestrian can be performed.

Like the radar apparatuses of the first through third embodiments, the radar apparatus of the fourth embodiment can accurately perform grouping and can determine whether or not an object is a pedestrian.

Modifications:

The radar apparatus of the present invention is not limited to the distance/velocity measurement methods described in the embodiments. For example, the present invention can be applied to conventionally known various measurement methods, such as one in which the FMCW method and the multi-frequency CW method are combined. In each of the methods, grouping for each object can be performed accurately by calculating, in addition to the first spectrum used for distance measurement which is the original purpose, the second spectrum by using a portion of the frequency band of the reception wave used for the distance measurement, and grouping, into a single group, a plurality of peaks of the first spectrum contained in each peak of the second spectrum.

In the radar apparatuses of the above-described embodiments, a plurality of receiving antennas are provided, and bearing (direction) is measured by DBF or a phase monopulse method. However, the method for bearing measurement is not limited thereto, and bearing may be measured by mechanically moving an antenna for scanning.

The radar apparatuses of the first through fourth embodiments measure the distance, velocity, and bearing of each object. However, it is sufficient that the radar apparatus of the present invention measures at least distance, and the radar apparatus of the present invention is not necessarily required to measure velocity and bearing.

In the same manner as described in the first embodiment, in the second through fourth embodiments as well, the grouping based on the result of bearing detection can be used additionally.

The radar apparatus of the present invention can be used as an onboard radar for the purpose of, for example, pedestrian detection.

What is claimed is:

1. A radar apparatus which transmits a transmission wave toward an object and receives a reception wave which is the transmission wave reflected by the object, wherein the radar apparatus is a FM-CW radar apparatus for calculating a distance to the object based on a difference frequency between the transmission wave and the reception wave, the radar apparatus, comprising:
    a beat signal generator for generating a beat signal having the difference frequency between the transmission wave and the reception wave;
    a first spectrum calculator for performing Fourier transformation on the beat signal output from the beat signal generator, and calculating a first frequency spectrum indicating a relationship between a reception wave intensity and the frequency;
    a grouping section which groups a plurality of peaks of the first frequency spectrum on an object-by-object basis;
    a change amount calculator for obtaining, for each of a plurality of peaks belonging to a group, a peak value corresponding to the intensity value of the reception wave at the present point in time, comparing the peak value with a peak value obtained at the past point in time before the present point in time, and calculating a change amount indicating a time variation of each peak value;
    a ratio calculator for comparing the change amount with a predetermined change amount threshold and calculating a ratio of the number of peaks whose change amounts are greater than the change amount threshold to the total number of the plurality of peaks belonging to the same group; and
    a pedestrian determination section for determining that the object is a pedestrian when the ratio calculated by the ratio calculator is greater than a predetermined ratio threshold and at least one of the plurality of peaks belonging to the same group differs from the remaining peaks in terms of the plus or minus sign of the difference between the peak value at the present point in time and the peak value at the past point in time before the present point in time.

2. A radar apparatus according to claim 1, wherein the change amount is at least one of the absolute value of the difference between the peak values, the standard deviation or the standard error of the peak values in a time change of the peak values, and the absolute value of the time derivative of a time change of the peak values.

3. A radar apparatus according to claim 2, further comprising:
    a second spectrum calculator for performing Fourier transformation on the beat signal output from the beat signal generator using a time period within a time period being one unit of Fourier transformation performed by the first spectrum calculator and shorter than the time period as one unit of Fourier transformation, and calculating a second frequency spectrum indicating a relationship between the reception wave intensity and the frequency,
    wherein, for each peak having a frequency range of the second frequency spectrum, the grouping section groups a plurality of peaks of the first frequency spectrum having a frequency existing within the frequency range of the peak of the second frequency spectrum while regarding the plurality of peaks as those from the same object.

4. A radar apparatus according to claim 1, further comprising:
    a second spectrum calculator for performing Fourier transformation on the beat signal output from the beat signal generator using a time period within a time period being one unit of Fourier transformation performed by the first spectrum calculator and shorter than the time period as one unit of Fourier transformation, and calculating a second frequency spectrum indicating a relationship between the reception wave intensity and the frequency,
    wherein, for each peak having a frequency range of the second frequency spectrum, the grouping section groups a plurality of peaks of the first frequency spectrum having a frequency existing within the frequency range of the peak of the second frequency spectrum while regarding the plurality of peaks as those from the same object.

5. A radar apparatus according to claim 4, wherein the grouping section extracts two local minimums present immediately before and after each peak of the second frequency spectrum, and groups a plurality of peaks of the first frequency spectrum located between the local minimums while regarding the plurality of peaks as those from the same object.

6. A radar apparatus which transmits a transmission wave toward an object and receives a reception wave which is the transmission wave reflected by the object,
    wherein the radar apparatus is a multiple frequency CW radar apparatus for using a difference frequency between the transmission wave and the reception wave as a Doppler frequency representing a relative speed of the object, calculating a distance to the object based on a delay time of the reception wave with respect to the transmission wave at the Doppler frequency, and repeating one cycle in which the frequency of the transmission wave is sequentially, step by step, changed as time passes, the radar apparatus comprising:
    a beat signal generator for generating a beat signal having the difference frequency between the transmission wave and the reception wave;
    a frequency analyzer for performing frequency analysis on the beat signal output from the beat signal generator for each step of the frequency of the transmission wave and calculating a frequency spectrum;

a first spectrum calculator for performing Fourier transformation on the change of the frequency of the frequency spectrum in one cycle for each peak value of the Doppler frequency of the frequency spectrum output from the frequency analyzer, and calculating a first spectrum indicating a relationship between a reception wave strength and the delay time;

a grouping section which groups a plurality of peaks of the first spectrum on an object-by-object basis;

a change amount calculator for obtaining, for each of a plurality of peaks belonging to a group, a peak value corresponding to the strength value of the reception wave at the present point in time, comparing the peak value with a peak value obtained at the past point in time before the present point in time, and calculating a change amount indicating a time variation of each peak value;

a ratio calculator for comparing the change amount with a predetermined change amount threshold and calculating a ratio of the number of peaks whose change amounts are greater than the change amount threshold to the total number of the plurality of peaks belonging to the same group; and a pedestrian determination section for determining that the object is a pedestrian when the ratio calculated by the ratio calculator is greater than a predetermined ratio threshold and at least one of the plurality of peaks belonging to the same group differs from the remaining peaks in terms of the plus or minus sign of the difference between the peak value at the present point in time and the peak value at the past point in time before the present point in time.

7. A radar apparatus according to claim 6, further comprising:

a second spectrum calculator for performing Fourier transformation on the frequency spectrum in a period shorter than one cycle for each peak value of the Doppler frequency of the frequency spectrum output from the frequency analyzer, and calculating a second spectrum indicating a relationship between the reception wave strength and the delay time;

wherein, for each peak having a delay time range of the second spectrum, the grouping section groups a plurality of peaks of the first spectrum having a delay time existing within the delay time range of each peak of the second spectrum while regarding the plurality of peaks as those from the same object.

8. A radar apparatus according to claim 7, wherein the grouping section extracts two local minimums present immediately before and after each peak of the second frequency spectrum, and groups a plurality of peaks of the first frequency spectrum located between the local minimums while regarding the plurality of peaks as those from the same object.

9. A radar apparatus which transmits a transmission wave toward an object and receives a reception wave which is the transmission wave reflected by the object, wherein the radar apparatus is a pulse radar apparatus for regarding a time difference between the transmission time of the transmission wave and the reception time of the reception wave as a distance to the object, the radar apparatus comprising:

a first detector for detecting a time waveform of the reception wave as the first time waveform;

a second detector for passing the reception wave through a filter of a predetermined frequency band and detects a time waveform of the passed reception wave as the second time waveform;

a grouping section for grouping a plurality of peaks of the first time waveform existing within the time range of each peak in the peaks having a time range of the second time waveform while regarding the plurality of peaks of the first time waveform as those from the same object;

a change amount calculator for obtaining, for each of a plurality of peaks belonging to a group, a peak value corresponding to the strength value of the reception wave at the present point in time, comparing the peak value with a peak value obtained at the past point in time before the present point in time, and calculating a change amount indicating a time variation of each peak value;

a ratio calculator for comparing the change amount with a predetermined change amount threshold and calculating a ratio of the number of peaks whose change amounts are greater than the change amount threshold to the total number of the plurality of peaks belonging to the same group; and a pedestrian determination section for determining that the object is a pedestrian when the ratio calculated by the ratio calculator is greater than a predetermined ratio threshold and at least one of the plurality of peaks belonging to the same group differs from the remaining peaks in terms of the plus or minus sign of the difference between the peak value at the present point in time and the peak value at the past point in time before the present point in time.

10. A radar apparatus according to claim 9, wherein the radar apparatus is a pulse compression radar apparatus.

11. A radar apparatus according to claim 9, wherein the grouping section extracts two local minimums present immediately before and after each peak of the second frequency spectrum, and groups a plurality of peaks of the first frequency spectrum located between the local minimums while regarding the plurality of peaks as those from the same object.

* * * * *